United States Patent
Al-Mousa et al.

(10) Patent No.: US 11,274,549 B2
(45) Date of Patent: Mar. 15, 2022

(54) LOGGING OPERATIONS IN OIL AND GAS APPLICATIONS

(71) Applicant: Saudi Arabian Oil Company, Dhahran (SA)

(72) Inventors: Ahmed Al-Mousa, Dhahran (SA); Qadir Looni, Dhahran (SA); Ahmed A. Al-Ramadhan, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/822,423

(22) Filed: Mar. 18, 2020

(65) Prior Publication Data
US 2021/0293135 A1 Sep. 23, 2021

(51) Int. Cl.
*E21B 17/02* (2006.01)
*E21B 47/12* (2012.01)
*E21B 17/00* (2006.01)
*E21B 19/16* (2006.01)

(52) U.S. Cl.
CPC ............ *E21B 47/12* (2013.01); *E21B 17/003* (2013.01); *E21B 17/02* (2013.01); *E21B 17/028* (2013.01); *E21B 17/023* (2013.01); *E21B 19/16* (2013.01)

(58) Field of Classification Search
CPC ........ E21B 19/16; E21B 17/02; E21B 17/028; E21B 17/023; E21B 47/12; E21B 17/003
See application file for complete search history.

(56) References Cited

U.S. PATENT DOCUMENTS

| | | | |
|---|---|---|---|
| 4,039,237 A | 8/1977 | Cullen et al. | |
| 4,603,578 A | 8/1986 | Stolz | |
| 4,898,240 A | 2/1990 | Wittrisch | |

(Continued)

FOREIGN PATENT DOCUMENTS

| | | |
|---|---|---|
| CN | 108756851 | 11/2018 |
| GB | 2203602 | 10/1988 |

(Continued)

OTHER PUBLICATIONS

PCT International Search Report and Written Opinion in International Appln. No. PCT/US2021/022784, dated Jun. 22, 2021, 15 pages.

(Continued)

*Primary Examiner* — Benyam Haile
(74) *Attorney, Agent, or Firm* — Fish & Richardson P.C.

(57) ABSTRACT

A method of performing a logging operation at a wellbore includes providing first and second pipe segments respectively including a first internal electrical cable and a second internal electrical cable, connecting a first end of the first internal electrical cable to a wireline cable of a logging tool to form a drill pipe string, lowering the drill pipe string, including the logging tool and the first pipe segment, into the wellbore, connecting a first end of the second internal electrical cable to a second end of the first internal electrical cable to add the second pipe segment to the drill pipe string, lowering the drill pipe string, including the logging tool, the first pipe segment, and the second pipe segment, into the wellbore, and connecting a second end of the second internal electrical cable to a surface logging unit to couple the surface logging unit to the drill pipe string.

19 Claims, 8 Drawing Sheets

(56) References Cited

U.S. PATENT DOCUMENTS

| | | | |
|---|---|---|---|
| 5,060,737 A * | 10/1991 | Mohn | E21B 4/006 |
| | | | 175/104 |
| 6,913,084 B2 | 7/2005 | Boyd | |
| 8,726,983 B2 | 5/2014 | Khan | |
| 8,899,338 B2 | 12/2014 | Elsayed et al. | |
| 9,200,486 B2 * | 12/2015 | Leveau | E21B 17/003 |
| 9,234,394 B2 | 1/2016 | Wheater et al. | |
| 9,976,407 B2 | 5/2018 | Ash et al. | |
| 10,087,752 B2 | 10/2018 | Bedonet | |
| 2002/0129945 A1 | 9/2002 | Brewer et al. | |
| 2004/0065446 A1 * | 4/2004 | Tran | E21B 47/12 |
| | | | 166/384 |
| 2005/0024231 A1 * | 2/2005 | Fincher | E21B 41/0085 |
| | | | 340/854.4 |
| 2006/0243453 A1 | 11/2006 | McKee | |
| 2009/0308656 A1 | 12/2009 | Chitwood | |
| 2011/0056681 A1 | 3/2011 | Khan | |
| 2012/0205908 A1 | 8/2012 | Fischer et al. | |
| 2021/0293094 A1 | 9/2021 | Al-Mousa et al. | |

FOREIGN PATENT DOCUMENTS

| | | |
|---|---|---|
| GB | 2427214 | 12/2006 |
| GB | 2453279 | 1/2009 |
| JP | 2001271982 | 10/2001 |
| RU | 2669969 | 10/2018 |

OTHER PUBLICATIONS

PCT International Search Report and Written Opinion in International Appln. No. PCT/US2021/022785, dated May 28, 2021, 14 pages.

\* cited by examiner

LOGGING OPERATIONS IN OIL AND GAS APPLICATIONS

TECHNICAL FIELD

This disclosure relates to drill pipe segments equipped with internal wireline cables and methods of carrying out a logging operation at a wellbore using such drill pipe segments.

BACKGROUND

Logging operations at a wellbore involve deploying a drill pipe string within the wellbore that includes multiple serially connected subs (for example, drill pipe string components) and a logging tool located at a downhole end of the subs for collecting formation data along the wellbore. Formation data acquired by the logging tool is sent to the surface of the wellbore along a wireline cable that must be deployed to the logging tool along an exterior surface of the drill pipe string and then inserted into a side-entry sub of the drill pipe string and connected to the logging tool. Several problems often arise as a result of deploying the wireline cable to the logging tool outside of the drill pipe string. For example, the exterior position of the wireline cable exposes the wireline cable to drilling fluid within the wellbore, which limits the rate at which drilling fluid can be pumped within the wellbore.

Another challenge involves accurately synchronizing running speeds of the wireline cable and the drill pipe string to avoid disconnection of the wireline cable from the drill pipe string. The exterior position of the wireline cable also prevents the drill pipe string from being rotated during tripping, as such rotation would cause the wireline cable to be damaged from wrapping around the drill pipe string. While such rotation would be beneficial in some cases (for example, to move the drill pipe string along tight regions within the wellbore), such rotation may not be permitted due to the risk of damage to the wireline cable. Furthermore, the wireline cable may be damaged due to friction as the wireline cable is squeezed between the drill pipe string and casing along the wellbore, requiring the entire drill pipe string to be pulled from the wellbore for replacement of the wireline cable at the side-entry sub before logging can be resumed. Such problems can incur significant losses in time and significant added costs for carrying out a logging operation.

SUMMARY

This disclosure relates to drill pipe segments (for example, drill pipe joints) that are assembled to form a drill pipe string for carrying out open hole logging operations in an improved manner as compared to conventional procedures for carrying out open hole logging operations. Each drill pipe segment is equipped internally with a wireline cable that carries signals providing logging data generated along an open hole in which the drill pipe string is deployed. The wireline cable includes sockets at opposite ends for mating and sealing with wireline cables of adjacent drill pipe segments for transporting the signals over long distances within the open hole.

In addition to the wireline cable, the drill pipe segment includes an outer pipe with a tubular shaft, as well as connectors located at opposite ends of the tubular shaft for assembling the drill pipe segment with adjacent drill pipe segments of the drill pipe string. The drill pipe segment further includes an inner pipe through which the wireline cable extends between the connectors. The inner pipe provides structural support for the wireline cable and protects the wireline cable along a majority of a length of the drill pipe segment. The drill pipe segment further includes two flow guides that are joined to opposite ends of the inner pipe. When adjacent drill pipe segments are assembled together, respective adjacent flow guides of the drill pipe segments contact each other to define a connection region that isolates and protects the connecting sockets of the respective wireline cables from drilling fluid within the drill pipe segments. An assembly including the inner pipe and the flow guides can move axially within the outer pipe to a limited extent and can rotate freely with respect to the outer pipe.

Carrying out an open hole logging operation using the drill pipe segments equipped internally with the wireline cables can avoid common limitations and problems often encountered while performing open hole logging operations using conventional wireline cables that are run externally along drill pipe segments and subsequently connected to a drill pipe string through a side entry sub.

In one aspect, a pipe segment includes an outer pipe including a shaft wall, a first connector disposed at a first end of the shaft wall, and a second connector disposed at a second end of the shaft wall opposite the first end, an electrical cable extending through the shaft wall along a length of the outer pipe between the first and second connectors, and an inner pipe positioned within the outer pipe and surrounding the electrical cable, the inner pipe being movable axially with respect to the outer pipe, and the outer pipe being movable rotationally with respect to the inner pipe.

Embodiments may provide one or more of the following features.

In some embodiments, the electrical cable includes a cable shaft, a first socket disposed at a first end of the cable shaft for connection to a first mating electrical cable, and a second socket disposed at a second end of the cable shaft opposite the first end for connection to a second mating electrical cable.

In some embodiments, the first and second sockets respectively include first and second seals that protect first and second electrical contacts of the electrical cable.

In some embodiments, the first and second sockets respectively include first and second threads by which the first and second sockets can be secured to first and second mating sockets of first and second mating electrical cables.

In some embodiments, the inner pipe is configured to protect the electrical cable along the length of the outer pipe.

In some embodiments, the pipe segment further includes an inner support member positioned within the outer pipe and spaced laterally apart from the inner pipe.

In some embodiments, the pipe segment further includes a first flow guide positioned at the first end of the outer pipe and a second flow guide positioned at the second end of the outer pipe.

In some embodiments, the inner pipe and the inner support member extend from the first flow guide to the second flow guide.

In some embodiments, the inner pipe and the inner support member are attached to the first and second flow guides.

In some embodiments, the inner pipe, the inner support member, and the first and second flow guides together form an inner assembly that is movable axially with respect to the outer pipe.

In some embodiments, the pipe segment further includes a first collar attached to the shaft wall of the outer pipe adjacent the first flow guide and a second collar attached to the shaft wall of the outer pipe adjacent the second flow guide, wherein the inner pipe and the inner support member extend through the first and second collars.

In some embodiments, the first and second collars are positioned to limit axial movement of the inner assembly within the outer pipe upon respective contact with the first and second flow guides.

In some embodiments, the pipe segment is configured such that the inner assembly is movable axially within the outer pipe by a distance of about 0.05 m to about 0.10 m.

In some embodiments, the outer pipe is rotatable with respect to the inner assembly.

In some embodiments, each of the first and second flow guides has a generally conical profile that guides fluid toward a central axis of the outer pipe.

In some embodiments, the electrical cable extends axially through each of the first and second flow guides.

In some embodiments, the first and second flow guides, together with the shaft wall of the outer pipe, together define portions of first and second connection zones within the outer pipe that respectively protect first and second end sockets of the wireline cable from fluid.

In some embodiments, the electrical cable is a first electrical cable and the inner pipe is a first inner pipe, and the pipe segment further includes a second electrical cable extending through the shaft wall along the length of the outer pipe between the first and second connectors and a second inner pipe positioned within the outer pipe and surrounding the second electrical cable.

In some embodiments, the second inner pipe is movable axially with respect to the outer pipe in fixed relationship to the first inner pipe.

In some embodiments, the second electrical cable and the second inner pipe are spaced laterally apart from the first electrical cable and the first inner pipe.

In another aspect, a pipe string includes a first pipe segment and a second pipe segment. The first pipe segment includes a first outer pipe including a shaft wall, a first connector disposed at a first end of the shaft wall, and a second connector disposed at a second end of the shaft wall opposite the first end, a first electrical cable extending through the shaft wall along a length of the first outer pipe between the first and second connectors, and an inner pipe positioned within the first outer pipe and surrounding the first electrical cable, the inner pipe being movable axially with respect to the first outer pipe, and the outer pipe being movable rotationally with respect to the inner pipe. The second pipe segment is configured to securely mate with the first pipe segment at either of the first and second connectors, and the second pipe segment includes an outer body and a second electrical cable extending through the outer body and configured to securely attach to the first electrical cable.

In another aspect, a method of performing a logging operation at a wellbore includes providing first and second pipe segments respectively including a first internal electrical cable and a second internal electrical cable, connecting a first end of the first internal electrical cable to a wireline cable of a logging tool to form a drill pipe string, lowering the drill pipe string, including the logging tool and the first pipe segment, into the wellbore, connecting a first end of the second internal electrical cable to a second end of the first internal electrical cable to add the second pipe segment to the drill pipe string, lowering the drill pipe string, including the logging tool, the first pipe segment, and the second pipe segment, into the wellbore, and connecting a second end of the second internal electrical cable to a surface logging unit to couple the surface logging unit to the drill pipe string.

Embodiments may provide one or more of the following features.

In some embodiments, the first and second internal electrical cables respectively extend entire first and second lengths of the first and second pipe segments.

In some embodiments, the method further includes placing a coupled portion of the first and second internal electrical cables in a wrapped configuration inside of the first and second pipe segments.

In some embodiments, the first and second pipe segments respectively further include first and second outer pipes that house the first and second internal electrical cables.

In some embodiments, the first and second pipe segments respectively further include first and second inner pipes that surround the first and second internal electrical cables within the first and second outer pipes.

In some embodiments, the method further includes securing the second outer pipe to the first outer pipe after connecting the first end of the second internal electrical cable to the second end of the first internal electrical cable.

In some embodiments, the method further includes rotating the second outer pipe with respect to the first outer pipe.

In some embodiments, the method further includes maintaining a coupled portion of the first and second internal electrical cables in a substantially fixed angular position while rotating the second outer pipe with respect to the first outer pipe.

In some embodiments, the method further includes moving a coupled portion of the first and second internal electrical cables axially with respect to the first and second outer pipes.

In some embodiments, the method further includes securing the first outer pipe to a body of the logging tool after connecting the first end of the first internal electrical cable to the wireline cable.

In some embodiments, the method further includes receiving one or more response signals from the logging tool before lowering the second pipe segment into the wellbore.

In some embodiments, the method further includes pulling the drill pipe string from the wellbore.

In some embodiments, the method further includes recording logging data at the surface logging unit while the drill pipe string is pulled from the wellbore.

In some embodiments, the method further includes disconnecting the second internal electrical cable from the first internal electrical cable and then disconnecting the first internal electrical cable from the wireline cable.

In some embodiments, the method further includes securing the first end of the second internal electrical cable to the second end of the first internal with a threaded fastener.

In some embodiments, the method further includes flowing a drilling fluid through the first and second pipe segments.

In some embodiments, the method further includes guiding a flow of the drilling fluid towards a central axis of the first and second pipe segments at ends of the first and second pipe segments.

In some embodiments, the method further includes substantially isolating the first and second internal electrical cables from the drilling fluid.

In some embodiments, the method further includes adding one or more additional pipe segments respectively including one or more additional internal electrical cables to the drill pipe string.

In some embodiments, the first pipe segment further includes a third internal electrical cable and the second pipe segment further includes a fourth internal electrical cable, wherein the wireline cable is a first wireline cable and the logging unit further includes a second wireline cable, and wherein the method further includes connecting a first end of the third internal electrical cable to the second wireline cable of the logging tool, connecting a first end of the fourth internal electrical cable to a second end of the third internal electrical cable, and connecting a second end of the fourth internal electrical cable to the surface logging unit.

The details of one or more embodiments are set forth in the accompanying drawings and description. Other features, aspects, and advantages of the embodiments will become apparent from the description, drawings, and claims.

DETAILED DESCRIPTION

Figure 1:
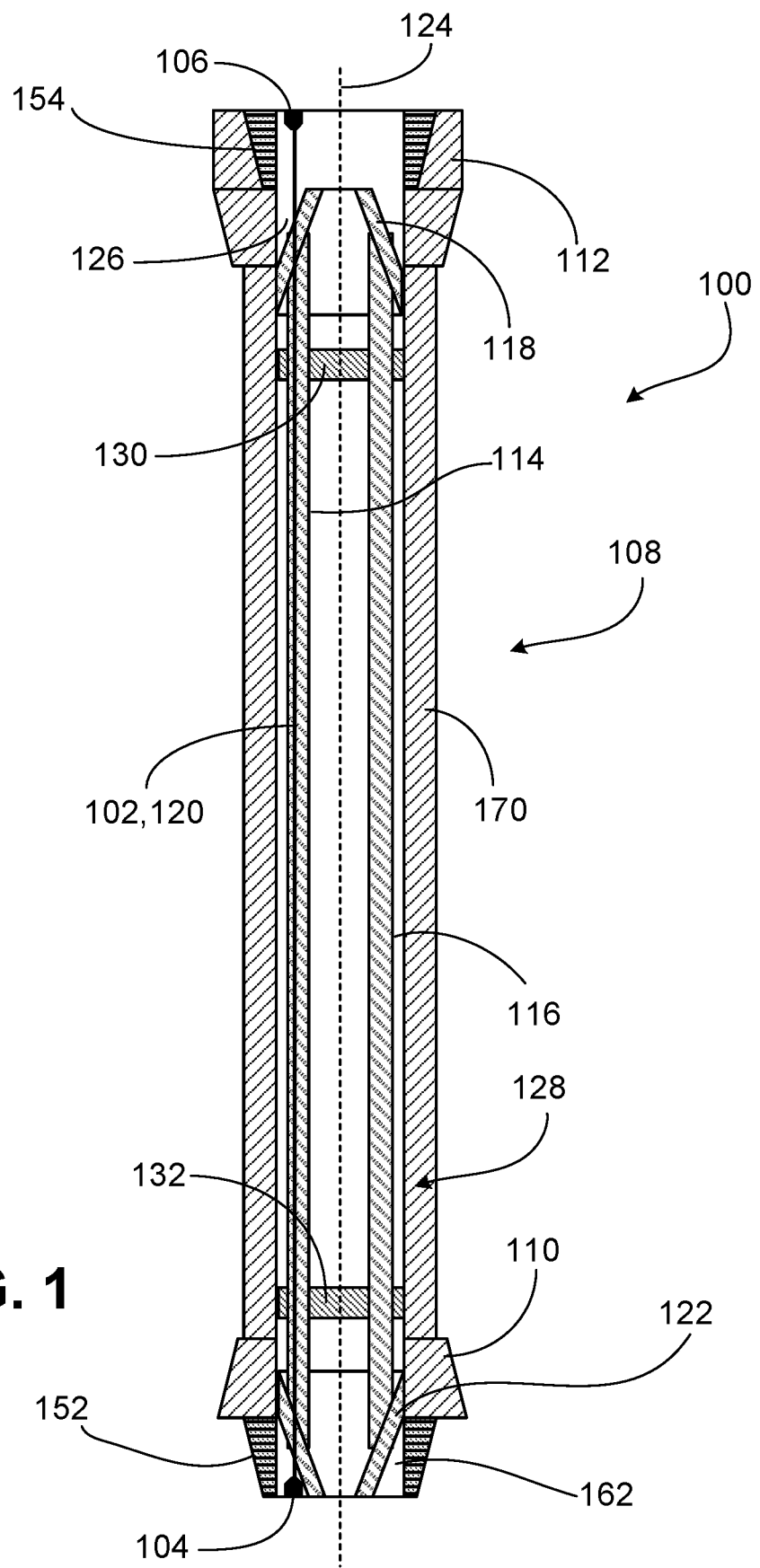
FIG. 1 is a cross-sectional view of a pipe segment that is equipped with a built-in wireline cable.

FIG. 1 illustrates a pipe segment 100 (for example, a drill pipe joint) that is designed to be assembled with like pipe segments 100 to form a drill pipe string for carrying out an open hole logging operation at a wellbore. The pipe segment 100 is equipped internally with a wireline cable 102 that carries signals providing logging data generated at a logging tool along an open hole (for example, an uncased portion of the wellbore) in which the drill pipe string is deployed. The wireline cable 102 includes a cable shaft 120 and male and female sockets 104, 106 located at opposite ends of the cable shaft 120 for mating and sealing with wireline cables 102 of adjacent pipe segments 100 to transport the signals over long distances within the open hole.

The pipe segment 100 includes an outer pipe 108 through which drilling fluid flows. The outer pipe 108 includes a tubular shaft 170, as well as a male connector 110 (for example, a connection pin) located at one end of the tubular shaft 170 and a female connector 112 (for example, a connection box) located at an opposite end of the tubular shaft 170 for assembling the pipe segment 100 with adjacent pipe segments 100 of the drill pipe string. The male connector 110 defines external threads 152, and the female connector 112 defines internal threads 154. The pipe segment 100 further includes an inner pipe 114 positioned along a first side of the outer pipe 108 through which the wireline cable 102 extends a full length of the pipe segment 100 between the male and female connectors 110, 112. The inner pipe 114 protects the wireline cable 102 along a majority of a length of the pipe segment 100. The wireline cable 102 is free to move along the inner pipe 114. However, the sockets 104, 106 are wider than an inner diameter of the inner pipe 114 such that the sockets 104, 106 can abut ends of the inner pipe 114 to prevent the wireline cable 102 from falling out of the inner pipe 114. The pipe segment 100 also includes an inner support member 116 (for example, a rod) positioned along a second, opposite side of the outer pipe 108 that provides structural support and balance for the inner pipe 114.

Figure 2:
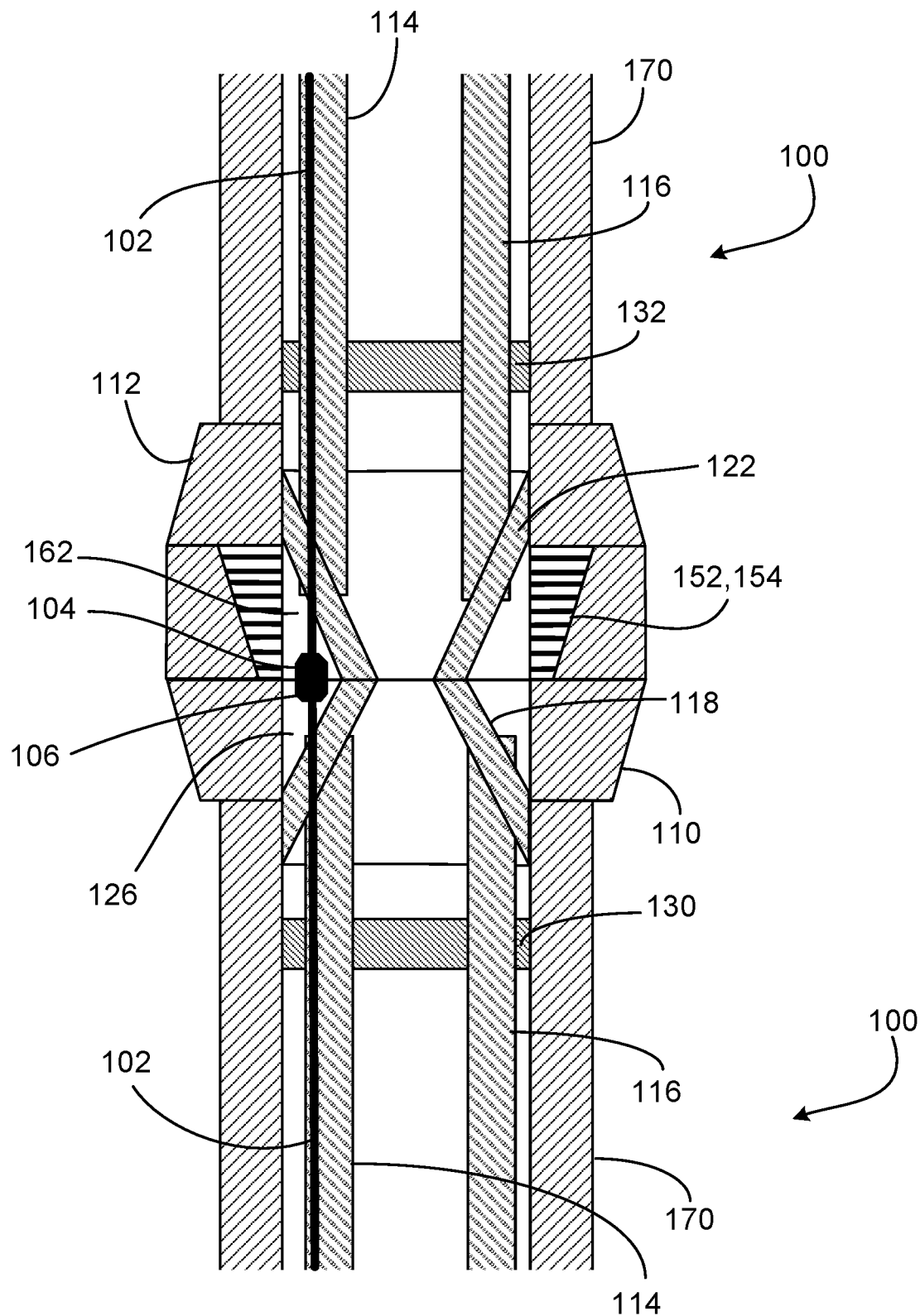
FIG. 2 is cross-sectional view of a portion of an assembly of two pipe segments of FIG. 1 joined together at mating ends with respective wireline cables extending straight through a connection region formed at the interface of the pipe segments.
Figure 3:
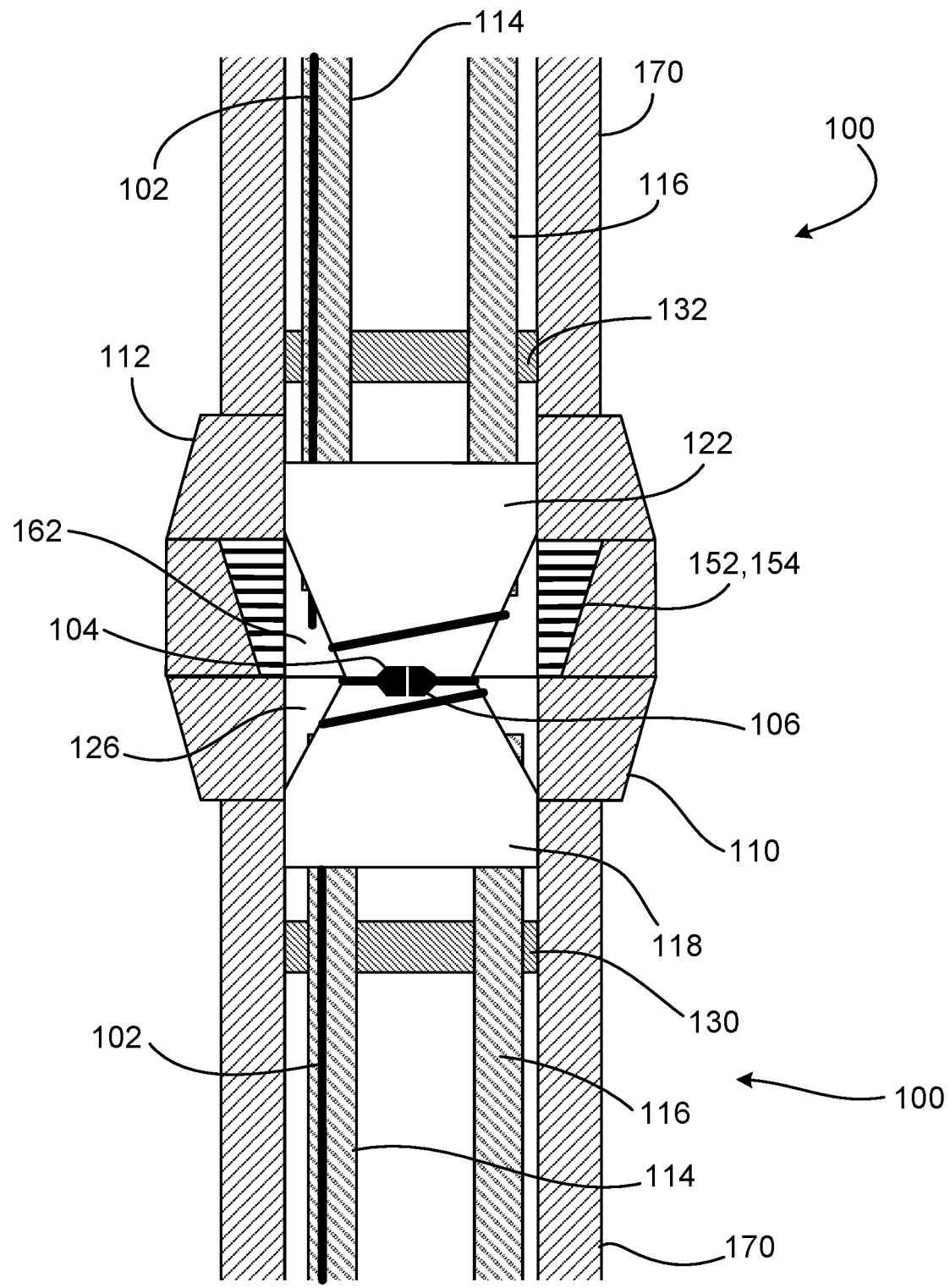
FIG. 3 is cross-sectional cut-away view of the portion of the assembly of FIG. 2 with the respective wireline cables wrapped around flow guides of the pipe segments within the connection region.

Referring to FIGS. 1-3, the pipe segment 100 also includes two flow guides 118, 122 that are joined to opposite ends of the inner pipe 114 and the inner support member 116. The flow guides 118, 122 are generally cone-shaped members (for example, the flow guides 118, 122 have a frusto-conical-shaped cross-sectional profile). The flow guides 118, 122 are formed to direct the drilling fluid towards a central axis 124 of the outer pipe 108 within the male and female connectors 110, 112. Thus, when adjacent pipe segments 100 are assembled together, respective adjacent flow guides 118, 122 of the pipe segments 100 contact each other to define a connection region that substantially isolates and protects the connecting sockets 104, 106 of the respective wireline cables 102 from the drilling fluid, which flows directly from one flow guide to the next, adjacent flow guide. The connection region is formed from adjacent connection zones 126, 162 that are defined respectively along the flow guides 122, 118. The flow guides 118, 122 are not attached to an inner surface of the outer pipe 108. Therefore, an assembly 128 of the flow guides 118, 122, the inner pipe 114, and the inner support member 116 can translate and rotate within and with respect to the outer pipe 108.

In some implementations, two wireline cables 102 may be attached end-to-end in a linear configuration, as shown in FIG. 2. In some implementations, two wireline cables 102 may be attached end-to-end in a wrapped configuration in which end portions of the wireline cables 102 are wrapped around adjacent flow guides 118, 122, as shown in FIG. 3. In the wrapped configuration, the flow guides 118, 122 may take up any slack in the wireline cables 102 and provide a structure for supporting the end portions of the wireline cables 102.

Figure 4:
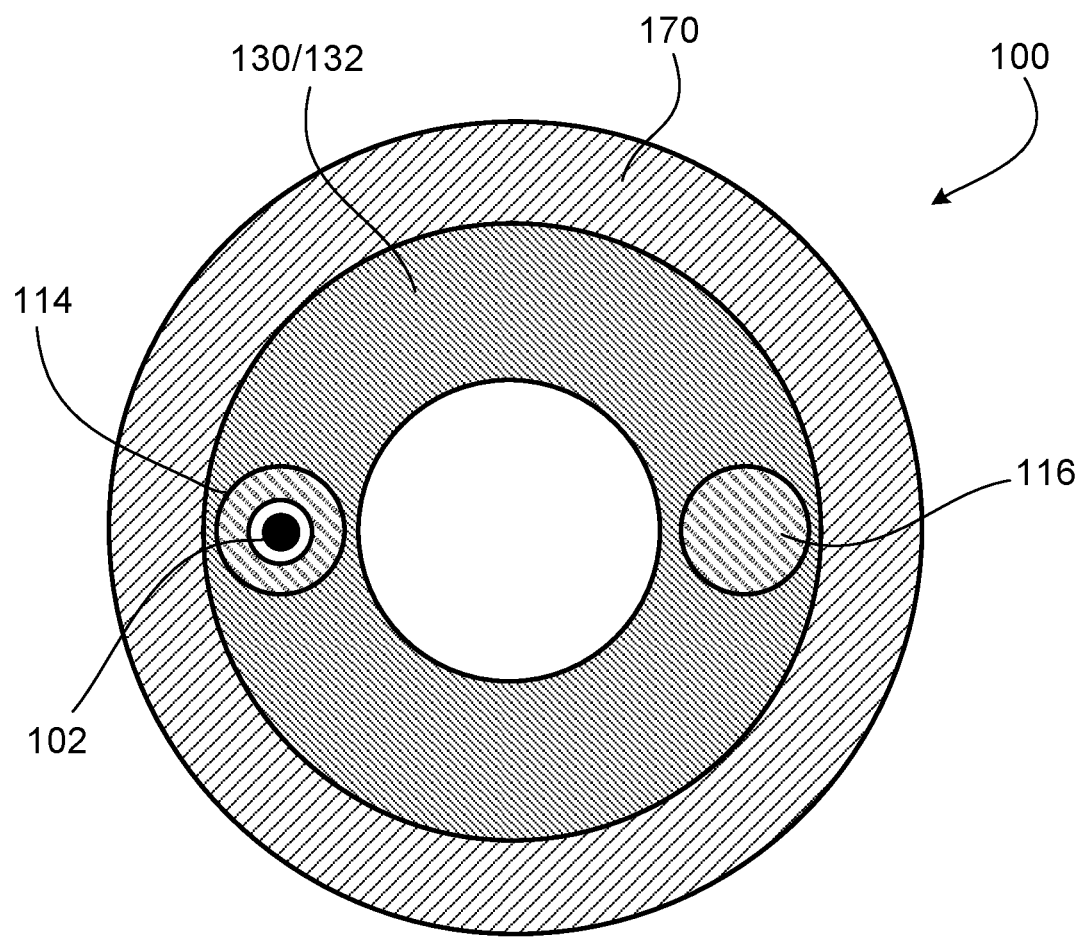
FIG. 4 is a cross-sectional view of the pipe segment of FIG. 1 through a stop collar of the pipe segment.

Referring to FIGS. 1 and 4, the pipe segment 100 further includes two oppositely located stop collars 130, 132 that are attached to the inner surface of the tubular shaft 170 of the outer pipe 108 in respective fixed positions. The stop collars 130, 132 are formed as generally annular-shaped discs that define openings through which the inner pipe 114 and the inner support member 116 extend. The stop collars 130, 132 therefore allow passage of the inner pipe 114 and the inner support member 116, but limit the extent to which the flow guides 118, 122 can move axially within the outer pipe 108 upon respective abutment of a flow guide 118, 122 with a stop collar 130, 132. Accordingly, the stop collars 130, 132 serve to limit axial play of the assembly 128. In some embodiments, the assembly 128 is movable axially within the outer pipe 108 by a total distance of about 0.05 m to about 0.10 m. In some instances, axial movement of the assembly 128 beneficially provides some movement flexibility and clearance for the inner pipe 114 pipe and the inner support member 116 to prevent them from buckling inside of the rigid outer pipe 108 under compression, bending, or torque.

In some embodiments, the pipe segment 100 has a total length that is in a range of about 9 meters (m) to about 10 m. In some embodiments, the tubular shaft 170 of the outer pipe has an outer diameter that is in a range of about 10.1 centimeters (cm) to about 12.7 cm, and an inner diameter that is in a range of about 8.1 cm to about 10.9 cm. The inner pipe 114 and the inner support member 116 have an equal length, and in some embodiments, the length is in a range of about 8.9 m to about 10.0 m. The inner pipe 114 and the inner support member 116 also typically have an equal outer diameter, and in some embodiments, the outer diameter is in a range of about 1.3 cm to about 2 cm. In some embodiments, the inner pipe 114 has an inner diameter that is in a range of about 1 cm to about 1.8 cm. The inner pipe 114 and the inner support member 16 are typically spaced apart laterally by a distance in a range of about 4 cm to about 6 cm. In some embodiments, the stop collars 130, 132 have a thickness that is in a range of about 5 cm to about 10 cm and an inner diameter that is in a range of about 3 cm to about 5 cm. In some embodiments, the flow guides 118, 122 have a length that is in a range of about 15 cm to about 20 cm, a maximum inner diameter that is equal to the inner diameter of the outer pipe 108, and a minimum inner diameter that is in a range of about 3 cm to about 6 cm. In some embodiments, the outer pipe 108, the connectors 110, 112, the inner pipe 114, the inner support member 116, the stop collars 130, 132, and the flow guides 118, 122 are typically made of one or more materials that provide relatively more flexibility as compared to steel, such as cast iron or aluminum. Such components may all be made of the same one or more materials or may be made of different materials.

Figure 5:
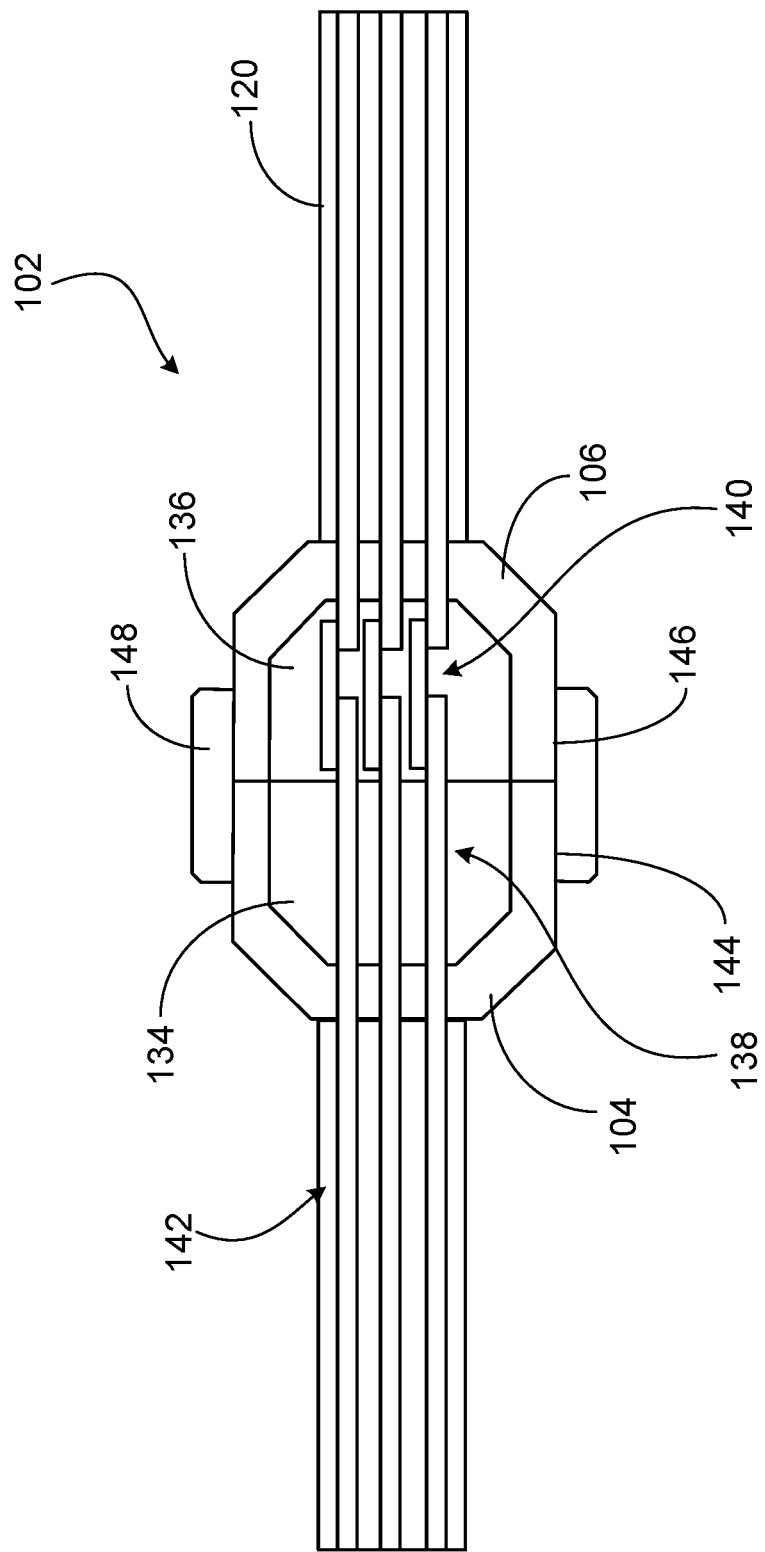
FIG. 5 is a cross-sectional view of a connection between cable sockets of two wireline cables of pipe segments of FIG. 1.

Referring to FIG. 5, each of the male and female sockets 104, 106 of the wireline cable 102 is equipped with a respective seal 134, 136 (for example, a rubber packing material) that prevents penetration of fluid and other matter into the sockets 104, 106. Accordingly, the seals 134, 136 protect ends 138, 140 (for example, electrical contacts) of cable lines 142 extending through the cable shaft 120 from any particulates or drilling fluid that may have entered the connection region formed by the connection zones 126, 162. The male and female sockets 104, 106 also have outer surface threads 144, 146 by which the male and female sockets 104, 106 can be secured to each other at a threaded fastener 148 (for example, a nut fastener) during assembly of adjacent pipe segments 100. In some embodiments, a wireline cable 102 has a length that is about equal to a length of the outer pipe 108. In some embodiments, the cable shaft 120 and the sockets 104, 106 may be made of made of one or more materials that provide electrical insulation, such as plastic or rubber materials.

Figure 6:
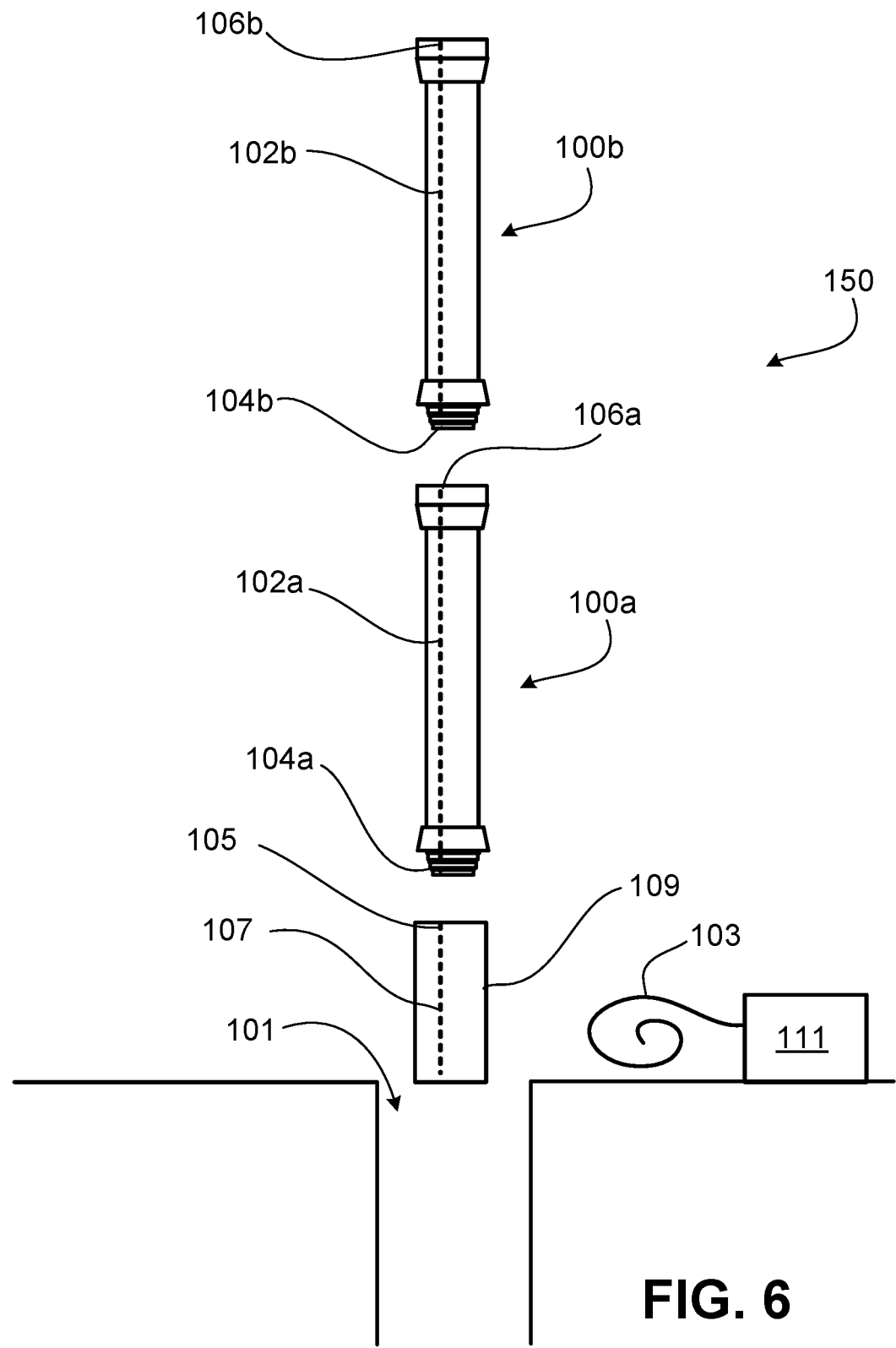
FIG. 6 is a schematic illustration of an arrangement of pipe segments of FIG. 1 and multiple other components for carrying out a logging operation.

Referring to FIG. 6, multiple pipe segments 100 (for example, pipe segments 100a, 100b, and additional pipe segments 100) may be connected to form a drill pipe string 150 for carrying out a logging operation along an open hole 101 of a wellbore 101. A female socket 105 of a wireline cable 107 of a logging tool 109 may be connected to a male socket 104a of a wireline cable 102a of a first pipe segment 100a. The first pipe segment 100a is then securely mated to the logging tool 109 by torqueing threads of the pipe segment 100a against threads of the logging tool 109. A first assembly of the first pipe segment 100a and the logging tool 109 is then lowered in a downhole direction into the wellbore 101.

With the first assembly lowered into the wellbore 101, a female socket 106a of the wireline cable 102a is connected to a male socket 104b of a wireline cable 102b of a second pipe segment 100b. A coupled portion of the wireline cables 102a, 102b may be wrapped around (for example, stored on) a flow guide of the first pipe segment 100a, as illustrated in FIG. 3. The second pipe segment 100b is then securely mated to the first pipe segment 100a by torqueing threads of the second pipe segment 100b against threads of the first pipe segment 100a. Since the wireline cables 102a, 102b are securely connected at the sockets 106a, 104b and the respective, adjacent flow guides are unattached to the outer pipes of the first and second pipe segments 100a, 100b, an assembly of the second pipe segment 100b that includes the wireline cable 102b, an inner pipe, an inner support member, and flow guides can remain angularly fixed (for example, non-rotational) while the second pipe segment 100b is rotated for connection to the first pipe segment 100a (for example, while an outer pipe of the second pipe segment 100b is rotated with respect to an outer pipe of the first pipe segment 100a). A second assembly of the second pipe segment 100b, the first pipe segment 100a, and the logging tool 109 is then lowered in the downhole direction into the wellbore 101.

With the second assembly lowered into the wellbore 101, a female socket 106b of the wireline cable 102b is connected to a male socket of a surface cable 103 that is coupled to a surface logging unit 111 (for example, a surface control module) to test the connectivity of the deployed logging tool 109. The surface logging unit 111 detects one or more response signals from the logging tool 109 via the surface cable 103 to determine whether the deployed logging tool 109 is properly connected and functioning. If it is determined at the surface logging unit 111 that the logging tool 109 lacks proper connectivity or functionality, then an onsite engineer performs trouble-shooting before continuing with the logging operation.

If it is determined at the surface logging unit 111 that the logging tool 109 is properly connected and functioning, then the female socket 106b of the wireline cable 102b is disconnected from the surface cable 103, and one or more additional pipe segments 100 are serially connected to the second pipe segment 100b in the manner as described above with respect to the connection between the pipe segments 100a, 100b. The assembly of the logging tool 109 and the pipe segments 100a, 100b, 100 together form the drill pipe string 150. The connected wireline cables 102 together form a single, contiguous wireline cable that is built in (for example, integral) to the drill pipe string 150. Once the desired number of pipe segments have been added to the drill pipe string 150 and the drill pipe string 150 has been lowered along the open hole such that the logging tool 109 is positioned at a bottom end (for example, a downhole-most end) of the required logging interval, then the exposed socket of the wireline cable of the uppermost pipe segment 100 is connected via the surface cable 103 to the surface logging unit 111.

The drill pipe string 150 is slowly pulled from the wellbore 101 while the logging tool 109 collects formation data (for example, measurement data) along the open hole of the wellbore 101 and sends the formation data to the surface logging unit 111 via the wireline cable. As each pipe segment is pulled from the wellbore 101, data collection is halted, and the pipe segment is disconnected from the surface logging unit 111 at the surface cable 103. The surface logging unit 111 is reconnected to the next pipe segment remaining in the wellbore 101 via the surface cable 103. Pulling of the drill pipe string 150 from the wellbore 101 and logging (for example, collecting data), with disconnection of each pipe segment as the pipe segment reaches the surface, are resumed and until the logging tool 109 has covered the entire logging interval along the open hole and has been pulled from the wellbore 101.

Figure 7:
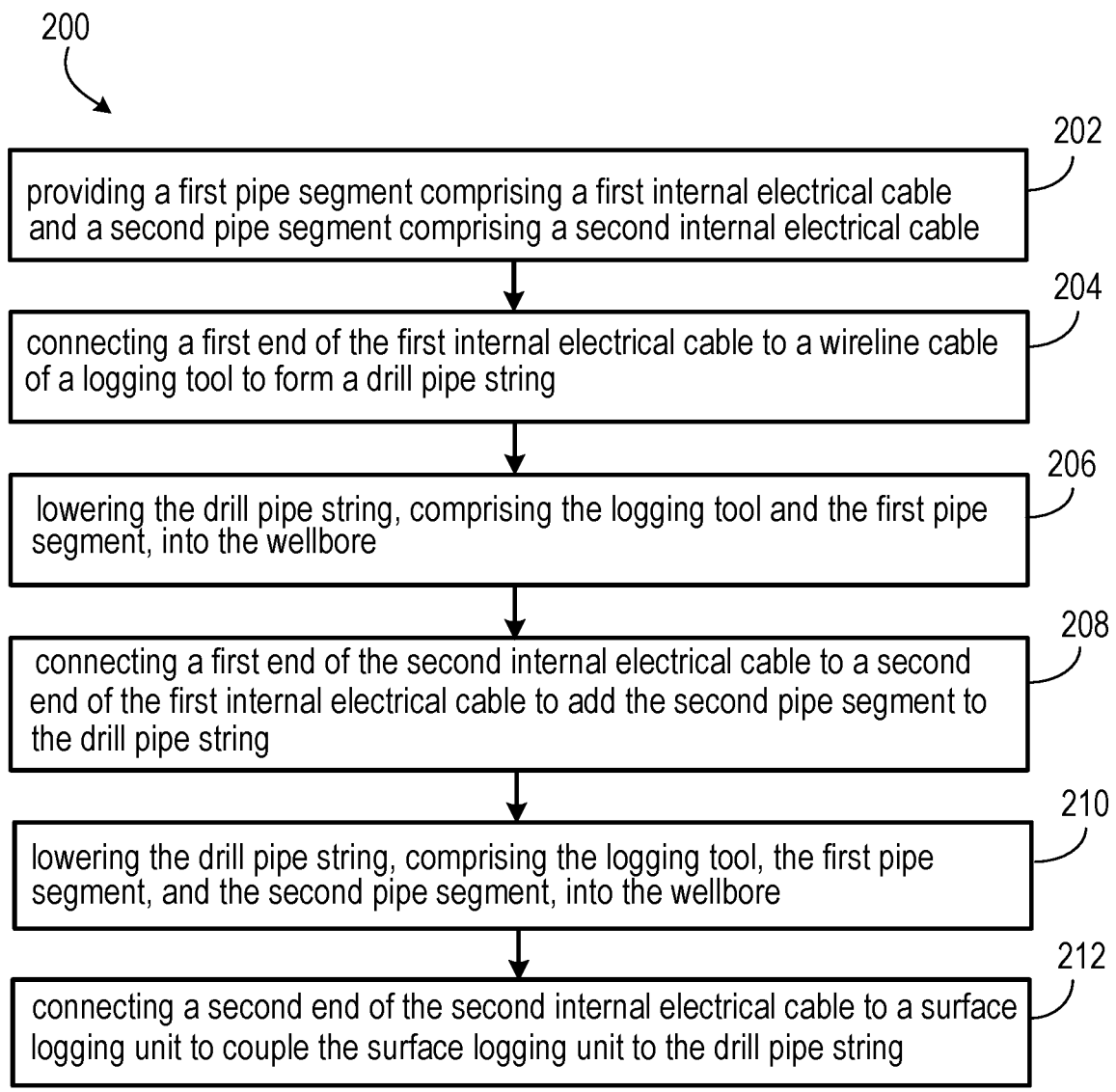
FIG. 7 is a flow chart illustrating an example method of performing a logging operation at a wellbore using pipe segments of FIG. 1.

FIG. 7 is a flow chart illustrating an example method 200 of performing a logging operation at a wellbore (for example, the wellbore 101). In some embodiments, the method 200 includes a step 202 for providing a first pipe segment (for example, the first pipe segment 100a) including a first internal electrical cable (for example, the wireline cable 102a) and a second pipe segment (for example, the second pipe segment 100b) including a second internal electrical cable (for example, the wireline cable 102b). In some embodiments, the method 200 further includes a step 204 for connecting a first end (for example, the socket 104a) of the first internal electrical cable to a wireline cable (for example, the wireline cable 107) of a logging tool (for example, the logging tool 109) to form a drill pipe string (for example, the drill pipe string 150). In some embodiments, the method 200 further includes a step 206 for lowering the drill pipe string, including the logging tool and the first pipe segment, into the wellbore. In some embodiments, the method 200 further includes a step 208 for connecting a first end (for example, the socket 104b) of the second internal electrical cable to a second end (for example, the socket 106a) of the first internal electrical cable to add the second pipe segment to the drill pipe string. In some embodiments, the method 200 further includes a step 210 for lowering the drill pipe string, including the logging tool, the first pipe segment, and the second pipe segment, into the wellbore. In some embodiments, the method 200 further includes a step 212 for connecting a second end (for example the socket 106b) of the second internal electrical cable to a surface logging unit (for example, the surface logging unit 111) to couple the surface logging unit to the drill pipe string.

Carrying out an open hole logging operation using pipe segments 100 equipped internally with the wireline cables 102 can avoid common limitations and problems often encountered while performing open hole logging operations using conventional wireline cables that are run externally along drill pipe joints and subsequently connected to drill pipe joints through a side entry sub. For example, a drill pipe string formed from pipe segments 100 may be rotated as an entire unit to overcome tight spaces within a well during tripping and logging without a risk of damaging wireline cables 102, as the wireline cables 102 are disposed in a protected configuration internal to the pipe segments 100. A configuration of the pipe segment 100 also protects the wireline cable 102 from the type of frictional forces experienced by conventional, exterior wireline cables and avoids the need to synchronize a running speed of a wireline cable with a running speed of a drill pipe string. Additionally, because the wireline cables 102 are protected (for example, electrically and mechanically) within inner pipes 114 and within a connection region formed by connection zones 126, 162, drilling fluid can be circulated within the drill pipe string without damaging the wireline cables 102. These aspects of the pipe segment 100 and its utilization are especially advantageous for carrying out logging operations within highly deviated and horizontal sections of a wellbore.

Figure 8:
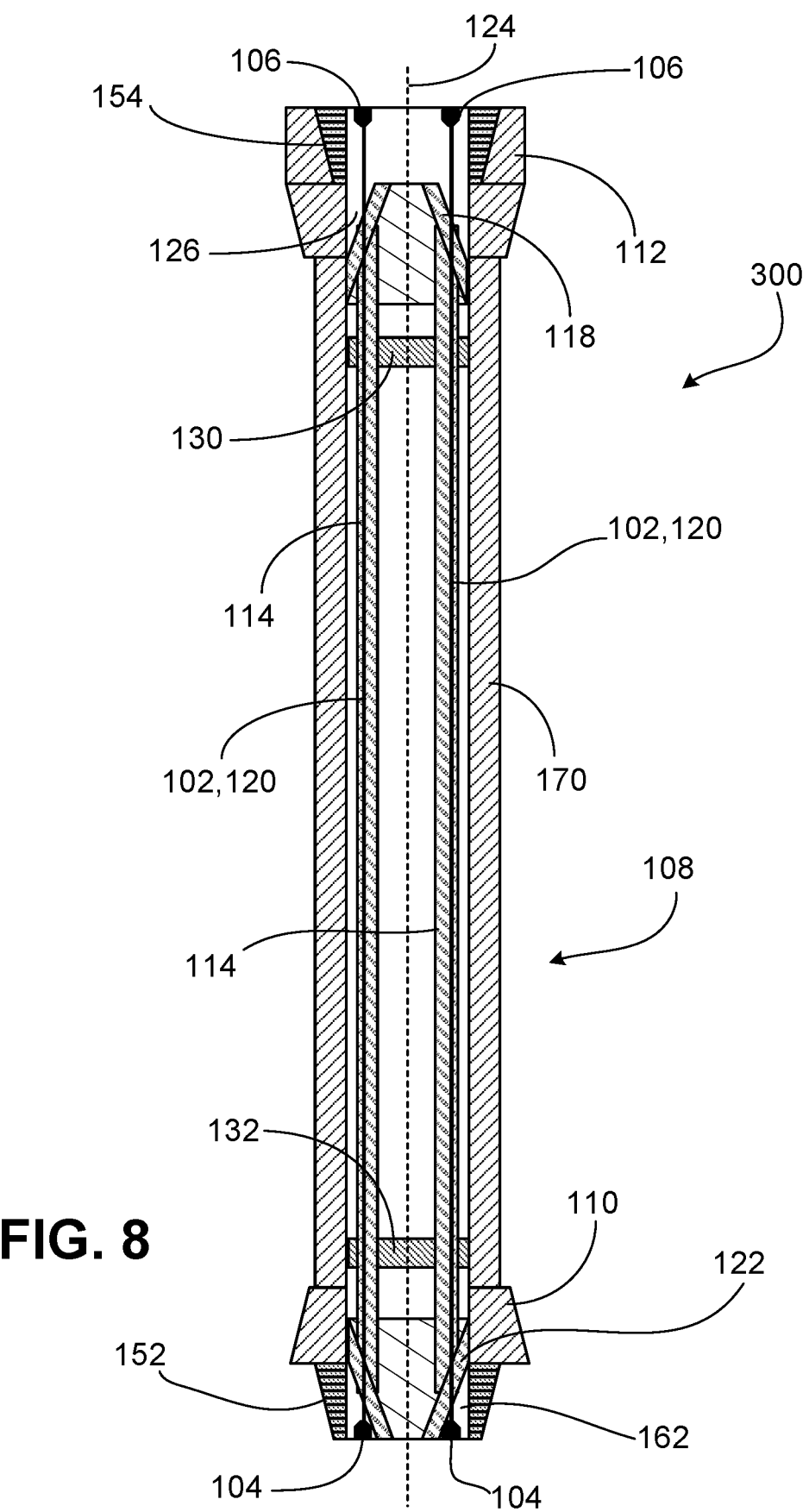
FIG. 8 is a cross-sectional view of a pipe segment that is equipped with two built-in wireline cables.

While the pipe segment 100 has been described and illustrated with respect to certain dimensions, sizes, shapes, arrangements, materials, and methods 200, in some embodiments, a pipe segment 100 that is otherwise substantially similar in construction and function to the pipe segment 100 may include one or more different dimensions, sizes, shapes, arrangements, configurations, and materials or may be utilized according to different methods. For example, as shown in FIG. 8, in some embodiments, a pipe segment 300 may include two wireline cables 102 for connection to a logging tool with a corresponding configuration (for example, a corresponding number of wireline cables). The pipe segment 300 includes an additional wireline cable 102 and an additional inner pipe 104 that protects the additional wireline cable 102 in place of the inner support member 116 of the pipe segment 100. The pipe segment 300 is otherwise substantially similar in construction and function to the pipe segment 100 and accordingly may be assembled with a drill pipe string in the manners described above with respect to the method 200.

Other embodiments are also within the scope of the following claims.

What is claimed is:
1. A method of performing a logging operation at a wellbore, the method comprising:
   providing a first pipe segment comprising:
      a first outer pipe having a first central axis,
      a first inner pipe disposed within a first interior region defined by the first outer pipe, wherein the first inner pipe is at a first radial position that is spaced apart from the first central axis and apart from the first outer pipe, wherein the first inner pipe is movable axially with respect to the first outer pipe, and
      a first internal electrical cable that extends through the first inner pipe, wherein the first internal electrical cable is movable along the first inner pipe, wherein the first internal electrical cable includes a socket at each respective end of the first internal electrical cable, wherein the socket at each respective end is wider than an inner diameter of the first inner pipe and abuts a respective end of the first inner pipe;
   providing a second pipe segment comprising:
      a second outer pipe having a second central axis,
      a second inner pipe disposed within a second interior region defined by the second outer pipe, wherein the second inner pipe is at a second radial position that is spaced apart from the second central axis and apart from the second outer pipe, wherein the second inner pipe is movable axially with respect to the second outer pipe, and
      a second internal electrical cable that extends through the second inner pipe, wherein the second internal electrical cable is movable along the second inner pipe, wherein the second internal electrical cable includes a socket at each respective end of the second internal electrical cable, wherein a socket at a respective end of the second internal electrical cable is configured to mate and seal with at a socket at a respective ends of the first internal electrical cable, wherein the socket at each respective end is wider than an inner diameter of the second inner pipe and abuts a respective end of the second inner pipe;
   connecting the socket at a first end of the first internal electrical cable to a wireline cable of a logging tool to form a drill pipe string;
   lowering the drill pipe string, comprising the logging tool and the first pipe segment, into the wellbore;

connecting the socket at a first end of the second internal electrical cable to a socket at a second end of the first internal electrical cable to add the second pipe segment to the drill pipe string;

lowering the drill pipe string, comprising the logging tool, the first pipe segment, and the second pipe segment, into the wellbore; and connecting a socket at a second end of the second internal electrical cable to a surface logging unit to couple the surface logging unit to the drill pipe string.

2. The method of claim 1, wherein the first and second internal electrical cables respectively extend entire first and second lengths of the first and second pipe segments.

3. The method of claim 1, further comprising placing a coupled portion of the first and second internal electrical cables in a wrapped configuration respectively around a first conical flow guide inside of the first pipe segment and around a second conical flow guide inside of the second pipe segment.

4. The method of claim 1, further comprising securing the second outer pipe to the first outer pipe after connecting the first end of the second internal electrical cable to the second end of the first internal electrical cable.

5. The method of claim 4, further comprising rotating the second outer pipe with respect to the first outer pipe.

6. The method of claim 5, further comprising maintaining a connection between the second end of the first internal electrical cable and the first end of the second internal electrical cable in a substantially fixed angular position while rotating the second outer pipe with respect to the first outer pipe and with respect to the connection.

7. The method of claim 4, further comprising moving a connection between the second end of the first internal electrical cable and the first end of the second internal electrical cable axially with respect to the first and second outer pipes.

8. The method of claim 1, further comprising securing the first outer pipe to a body of the logging tool after connecting the first end of the first internal electrical cable to the wireline cable.

9. The method of claim 1, further comprising receiving one or more response signals from the logging tool before lowering the second pipe segment into the wellbore.

10. The method of claim 1, further comprising pulling the drill pipe string from the wellbore.

11. The method of claim 10, further comprising recording logging data at the surface logging unit while the drill pipe string is pulled from the wellbore.

12. The method of claim 10, further comprising disconnecting the second internal electrical cable from the first internal electrical cable and then disconnecting the first internal electrical cable from the wireline cable.

13. The method of claim 1, further comprising securing the first end of the second internal electrical cable to the second end of the first internal with a threaded fastener.

14. The method of claim 1, further comprising flowing a drilling fluid through the first and second pipe segments.

15. The method of claim 14, further comprising guiding a flow of the drilling fluid radially away from the second end of the first internal electrical cable and radially away from the first end of the second internal electrical cable towards the first and second central axes of the first and second pipe segments respectively with first and second conical flow guides located at ends of the first and second pipe segments, wherein the first conical flow guide and the first outer pipe together define a first pipe connection zone that isolates the second end of the first internal electrical cable from the drilling fluid, and wherein the second conical flow guide and the second outer pipe together define a second pipe connection zone that isolates the first end of the second internal electrical cable from the drilling fluid.

16. The method of claim 15, further comprising substantially isolating the first and second internal electrical cables from the drilling fluid.

17. The method of claim 1, further comprising adding one or more additional pipe segments respectively comprising one or more additional internal electrical cables to the drill pipe string.

18. The method of claim 1, wherein the first pipe segment further comprises a third internal electrical cable and the second pipe segment further comprises a fourth internal electrical cable, and wherein the wireline cable is a first wireline cable and the logging unit further comprises a second wireline cable, the method further comprising:

connecting a first end of the third internal electrical cable to the second wireline cable of the logging tool;

connecting a first end of the fourth internal electrical cable to a second end of the third internal electrical cable; and connecting a second end of the fourth internal electrical cable to the surface logging unit.

19. The method of claim 1, wherein the first outer pipe and the first inner pipe are provided in a non-concentric arrangement, and wherein the second outer pipe and the second inner pipe are provided in a non-concentric arrangement.

* * * * *